United States Patent [19]
Longacre, Jr. et al.

[11] Patent Number: 5,949,052
[45] Date of Patent: Sep. 7, 1999

[54] OBJECT SENSOR SYSTEM FOR STATIONARY POSITION OPTICAL READER

[75] Inventors: Andrew Longacre, Jr., Skaneateles; Robert M. Hussey, Liverpool, both of N.Y.

[73] Assignee: Welch Allyn, Inc., Skaneateles Falls, N.Y.

[21] Appl. No.: 08/953,199

[22] Filed: Oct. 17, 1997

[51] Int. Cl.⁶ .................................................. G06K 7/10
[52] U.S. Cl. .............................. 235/462.08; 235/462.04
[58] Field of Search ........................ 235/462.04, 462.08

[56] References Cited

U.S. PATENT DOCUMENTS

| | | |
|---|---|---|
| 5,039,847 | 8/1991 | Morii et al. . |
| 5,343,028 | 8/1994 | Figarella et al. ................... 235/462.04 |
| 5,513,017 | 4/1996 | Knodt et al. . |
| 5,550,366 | 8/1996 | Roustaei . |
| 5,557,091 | 9/1996 | Krummel . |

*Primary Examiner*—Harold I. Pitts
*Attorney, Agent, or Firm*—Wall Marjama Bilinski & Burr

[57] ABSTRACT

The present invention relates to a system for sensing the presence of an object in the field of view of an imaging assembly of a stationary position optical reader. The system includes a specialized symbol disposed in a stationary position in relation to the imaging assembly of a specially configured optical reader. An optical reader according to the invention is configured to determine whether an object is in the field of view of the imaging assembly and determining whether features of the specialized symbol are present in the image information.

20 Claims, 5 Drawing Sheets

OBJECT SENSOR SYSTEM FOR STATIONARY POSITION OPTICAL READER

BACKGROUND OF THE INVENTION

1. Field of the Invention

The invention relates generally to stationary position type optical readers and particularly to an object sensing system for a stationary position type optical reader.

2. Background of the Prior Art

Many available fixed position optical readers, typically termed "presentation scanners" are configured to operate in a continuous scan mode; that is they continuously capture and attempt to decode bar code symbols without regard to whether a symbol-bearing substrate is in the field of view.

A continuous scan operating configuration requires repetitive illumination flashing of an LED array in the case of an image sensor based optical reader and repetitive laser scanning in the case of a laser scan engine based optical reader. Repetitive flashing illumination or laser scanning requires a high level of energy consumption and can result in premature component degradation. Furthermore, the flashing illumination has been observed to be highly distracting to users of such optical readers configured to continuously scan image data.

U.S. Pat. No. 5,550,366 describes a system for automatically activating image scanning in a portable bar code reader wherein bar code image capturing and decoding is commenced when the presence of a bar code in a target area is detected. However, the detection of a bar code in the target area is carried out on a period basis and requires activation of a high radiance source of illumination. Accordingly, the system is not responsive in real time to an object being moved into the field of view of the reader, and the high radiance illumination required for operation of the system remains a source of distraction.

There is a need for a fixed position optical reader which automatically reads indicia on objects presented to the reader without continuously scanning images when objects are not present in the field of view of the reader's imaging assembly.

SUMMARY OF THE INVENTION

According to its major aspects and broadly stated the present invention is a stationary position optical reader having incorporated therein a sensor system for sensing the presence of an object in the field of view of the optical reader.

Optical readers of the type in which the present invention may be incorporated include an imaging assembly which is directed toward a stationary target location. In general, the imaging assembly may be image sensor based or laser scan engine based and may be adapted to capture images in 1 or 2 dimensions.

The system of the invention includes an optical reader specially configured for use in the system, and an object detection symbol. According to the invention, the object detection symbol is disposed in the field of view of the imaging assembly.

In general, the system determines whether or not an object is in the field of view of the imaging assembly by analyzing image information output by the imaging assembly. If features of the object detection symbol are present in the image information, then the condition is indicated that there is no object in the field of view of the imaging assembly. If features of the object detection symbol are not present in the image information then the condition is indicated that an object is present in the field of view. According to the invention, the operating state of the reader is dependant on whether features of the object detection symbol are present in the image information.

In one embodiment, an optical reader according to the system is configured, in an active state of operation, to continuously capture and read the scene in the reader's field of view and attempts to decode any symbol which may be in the field of view. The field of view of the optical reader includes the object detection symbol in the case that there is no object in the path between the detection symbol and the imaging assembly of the reader. Accordingly if the symbol detected in the active state of operation is an object detection symbol then the condition is indicated that there is no object in the path between the symbol and the reader.

If the object detection symbol is read (indicating that the path between the symbol and the imaging assembly is clear of an object) then the reader switches operation to an inactive operating state. In the inactive operating state, the reader does not attempt to decode any symbol in the field of view of the imaging assembly. Instead, the primary function of the reader in an inactive operating state is to confirm whether the object detection symbol is in the field of view of the imaging assembly.

The characteristics of the reader in an inactive operating state may take on a variety of forms. In general, however, the inactive state normally is characterized by a lower radiance illumination than the active operating state. The inactive operating state can be carried out using a lower radiance illumination, in, part, because as a stationary position indicia, the object detection symbol can be successfully captured with increased exposure time. In addition, the optical characteristics of the object detection symbol can be enhanced to further reduce the illumination requirements of the reader during the inactive operating state. For example, the object detection symbol may be formed on a retroflective substrate which reflects light preferentially in the direction at which light is received, or else may be backlit with a low radiance illumination source. Because the reader does not require a high radiance source of illumination during the inactive state, the reader does not continuously flash when a symbol bearing substrate is not present in the field of view as in the case of an optical reader configured in a continuous scan mode.

In another aspect of the inactive operating state, the inactive operating state can be carried out without using a full scale decoding algorithm, wherein image data representing a full field of view of an imaging assembly is captured and processed. Because the location of the object detection symbol in the field of view of an imaging assembly can be precisely determined, a detection symbol verifier algorithm can be made which selectively evaluates only so much image data which is necessary to determine whether the object symbol is in the field of view.

In one embodiment of the inactive operating state, the pixel position of an object symbol previously determined and recorded into a memory space during an active operating state is retrieved from the memory space during an inactive state of operation. In an object detection symbol verifier algorithm executed in the inactive state which makes use of pixel position data pertaining to the position of the symbol, a reader selectively captures and/or selectively reads only that image data representing at least a portion of the object detection symbol and does not process image data that does not represent at least a portion of the object detection symbol.

When the reader in an inactive state concludes that the object detection symbol is not in the field of view, then the reader's operation reverts to the active state of operation and attempts to decode any symbol which may be in the field of view.

These and other details, advantages and benefits of the present invention will become apparent from the detailed description of the preferred embodiment hereinbelow.

BRIEF DESCRIPTION OF THE DRAWINGS

The preferred embodiment of the invention will now be described, by way of example only, with reference to the accompanying Figures wherein like members bear like reference numerals and wherein.

DETAILED DESCRIPTION OF THE PREFERRED EMBODIMENT

Figure 1A:
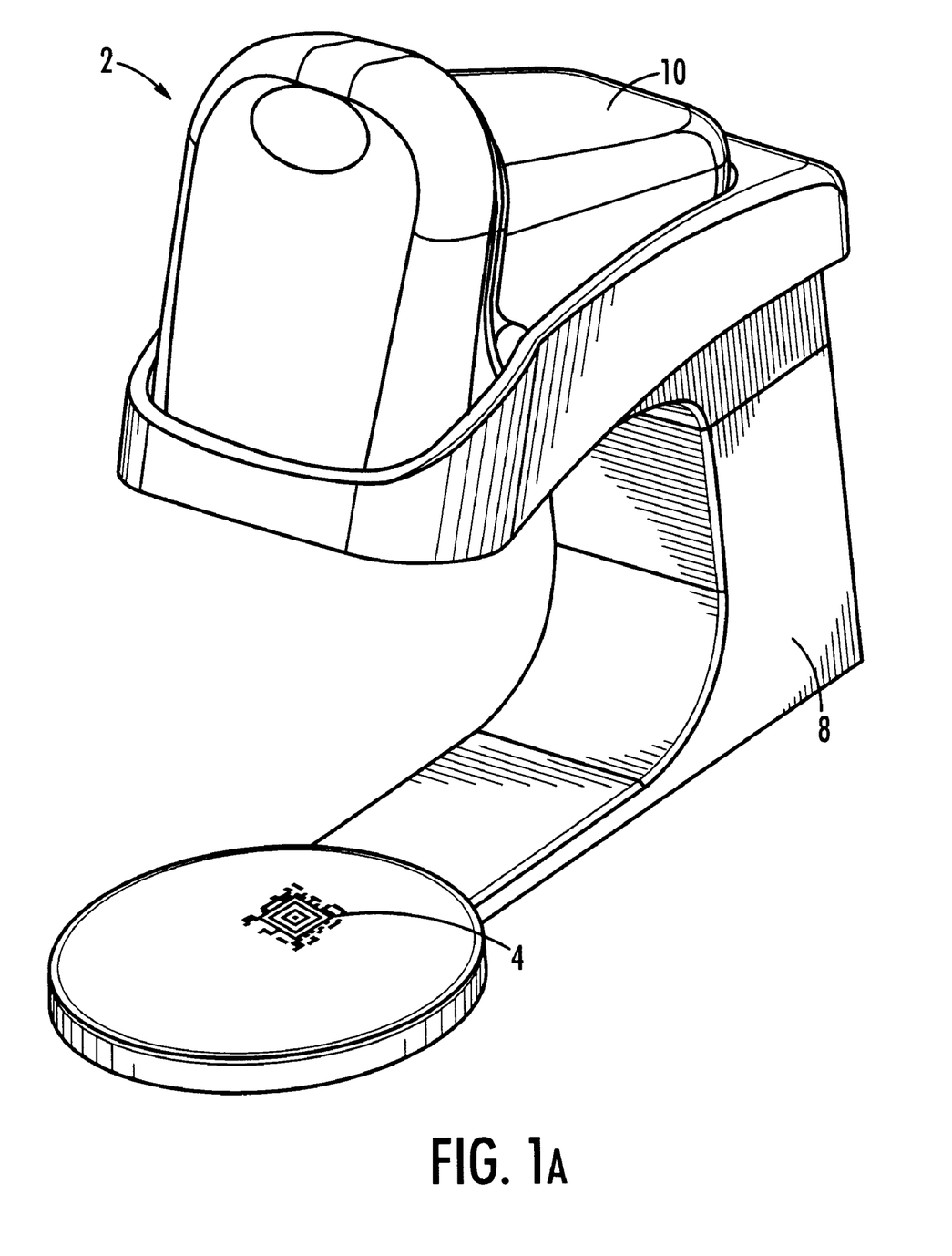
FIG. 1A shows a schematic diagram of the system of the invention comprising a stationary position optical reader and an object detection symbol.

A schematic diagram of the object detection system of the invention is shown in FIG. 1A. System 2 includes an object detection symbol 4 disposed at a stationary location and a complementarily configured stationary position optical reader 10. In the specific embodiment of FIG. 1A, reader 10 is provided by a hand held portable optical reader which is held in a stationary position in relation to symbol 4 by stand 8.

In general, system 2 determines whether or not an object is in the field of view of the imaging assembly by analyzing image information output the imaging assembly. If features of object detection symbol 4 are present in the image information, then the condition is indicated that there is no object in the field of view of the imaging assembly. If features of object detection symbol 4 are not present in the image information then the condition is indicated that an object is present in the field of view. According to the invention, the operating state of reader 10 is dependant on whether features of the object detection symbol are present in the image information. In an active operating state, which may be executed when the image information indicates that an object is in the field of view, the reader normally operates in a full decode mode. The reader normally captures image data representing a scene defined by the entire field of view of imaging assembly 30 utilizing a reader illumination level of a standard radiance. In an inactive operating state, which is executed when the image information indicates that there is no object in the field of view, the reader normally executes a symbol verifier algorithm which normally does not require capturing of image data representing a scene defined by the entire field of view of imaging assembly, and which can be carried out using a reader illumination level of reduced radiance.

Shown as being provided by a relatively sophisticated two-dimensional bar code symbol, object detection symbol 4 may comprise virtually any combination of at least one relatively dark space of any shape with a relatively light space. The important requirement of object detection symbol 4 is that the symbol include sufficient optical characteristics such that reader can provide an electrical representation of the symbol having sufficiently distinguishing features so as to determine, by an evaluation of the representation, whether an object has been disposed in the path between the reader's imaging assembly and the detection symbol 4. Preferably, object detection symbol 4 is disposed slightly below the center of the field of view of the reader's imaging assembly from the perspective of reader 10 so that objects presented to system 2 are substantially in the field of view when their presence is detected.

Figure 2:
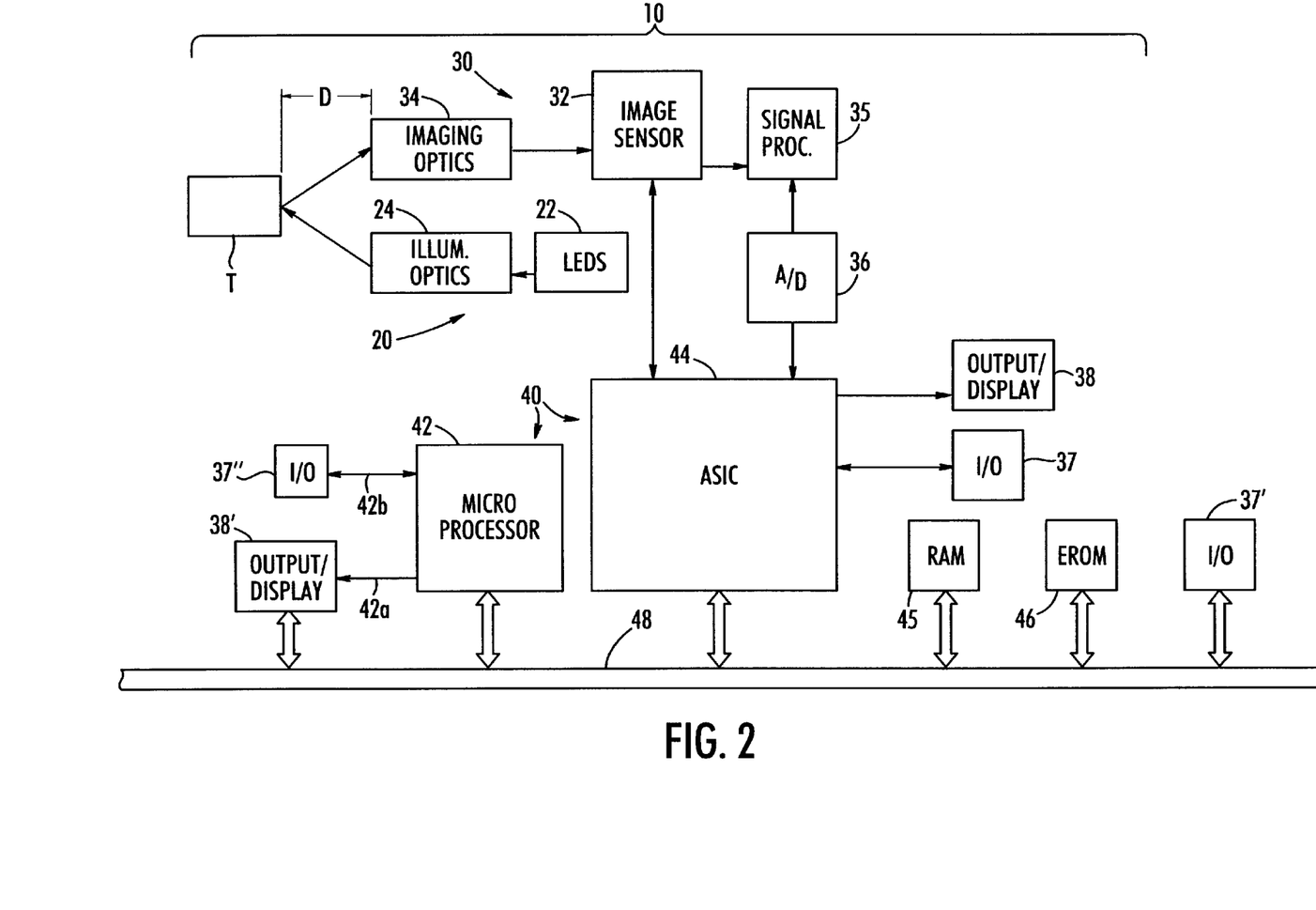
FIG. 2 illustrates a block diagram of an optical reader of a type which may be incorporated into the system of the invention.

A block diagram of an optical reader of a type which may be implemented in the system of the invention is shown in FIG. 2. Optical reader 10 includes an illumination assembly 20 for illuminating a target object T, such as a 1D or 2D bar code symbol, and an imaging assembly 30 for receiving an image of object T and generating an electrical output signal indicative of the data optically encoded therein. Illumination assembly 20 may, for example, include an illumination source assembly 22, such as one or more LEDs, together with an illuminating optics assembly 24, such as one or more reflectors, for directing light from light source 22 in the direction of target object T. Illumination assembly 20 may be eliminated if ambient light levels are certain to be high enough to allow high quality images of object T to be taken. Imaging assembly 30 may include an image sensor 32, such as a 2D CCD or CMOS solid state image sensor, together with an imaging optics assembly 34 for receiving and focusing an image of object T onto image sensor 32. The array-based imaging assembly shown in FIG. 2 may be replaced by a laser scanning based imaging assembly comprising a laser source, a scanning mechanism, emit and receive optics, a photodetector and accompanying signal processing circuitry.

Optical reader 10 of FIG. 2 also includes programmable controller 40 which preferably comprises an integrated circuit microprocessor 42 and an application specific integrated circuit or ASIC 44. Processor 42 and ASIC 44 are both programmable control devices which are able to receive, output and process data in accordance with a stored program stored in either or both of a read/write random access memory or RAM 45 and an erasable read only memory or EROM 46. Processor 42 and ASIC 44 are also both connected to a common bus 48 through which program data and working data, including address data, may be received and transmitted in either direction to any circuitry that is also connected thereto. Processor 42 and ASIC 44 differ from one another, however, in how they are made and how they are used.

More particularly, processor 42 is preferably a general purpose, off-the-shelf VLSI integrated circuit microprocessor which has overall control of the circuitry of FIG. 2, but which devotes most of its time to decoding image data stored in RAM 45 in accordance with program data stored in EROM 46. Processor 44, on the other hand, is preferably a special purpose VLSI integrated circuit, such as a programmable logic or gate array, which is programmed to devote its time to functions other than decoding image data, and thereby relieve processor 42 from the burden of performing these functions.

The actual division of labor between processors 42 and 44 will naturally depend on the type of off-the-shelf microprocessors that are available, the type of image sensor which is used, the rate at which image data is output by imaging assembly 30, etc. There is nothing in principle, however, that requires that any particular division of labor be made between processors 42 and 44, or even that such a division be made at all. This is because special purpose processor 44 may be eliminated entirely if general purpose processor 42 is fast enough and powerful enough to perform all of the functions contemplated by the present invention. It will, therefore, be understood that neither the number of processors used, nor the division of labor therebetween, is of any fundamental significance for purposes of the present invention.

With processor architectures of the type shown in FIG. 2, a typical division of labor between processors 42 and 44 will be as follows. Processor 42 is preferably devoted primarily to the tasks of decoding image data, once such data has been stored in RAM 45, handling the menuing options and reprogramming functions, and providing overall system level coordination. Processor 44 is preferably devoted primarily to controlling the image acquisition process, the A/D conversion process and the storage of image data, including the ability to access memories 45 and 46 via a DMA channel. Processor 44 may also perform many timing and communication operations. Processor 44 may, for example, control the illumination of LEDs 22, the timing of image sensor 32 and an analog-to-digital (A/D) converter 36, the transmission and reception of data to and from a processor external to reader 10, through an RS-232 (or other) compatible I/O device 37 and the outputting of user perceptible data via an output device 38, such as a beeper, a good read LED and/or a liquid crystal display. Control of output, display and I/O functions may also be shared between processors 42 and 44, as suggested by bus driver I/O and output/display devices 37' and 38' or may be duplicated, as suggested by microprocessor serial I/O ports 42A and 42B and I/O and display devices 37" and 38'. As explained earlier, the specifics of this division of labor is of no significance to the present invention.

Figure 3A:
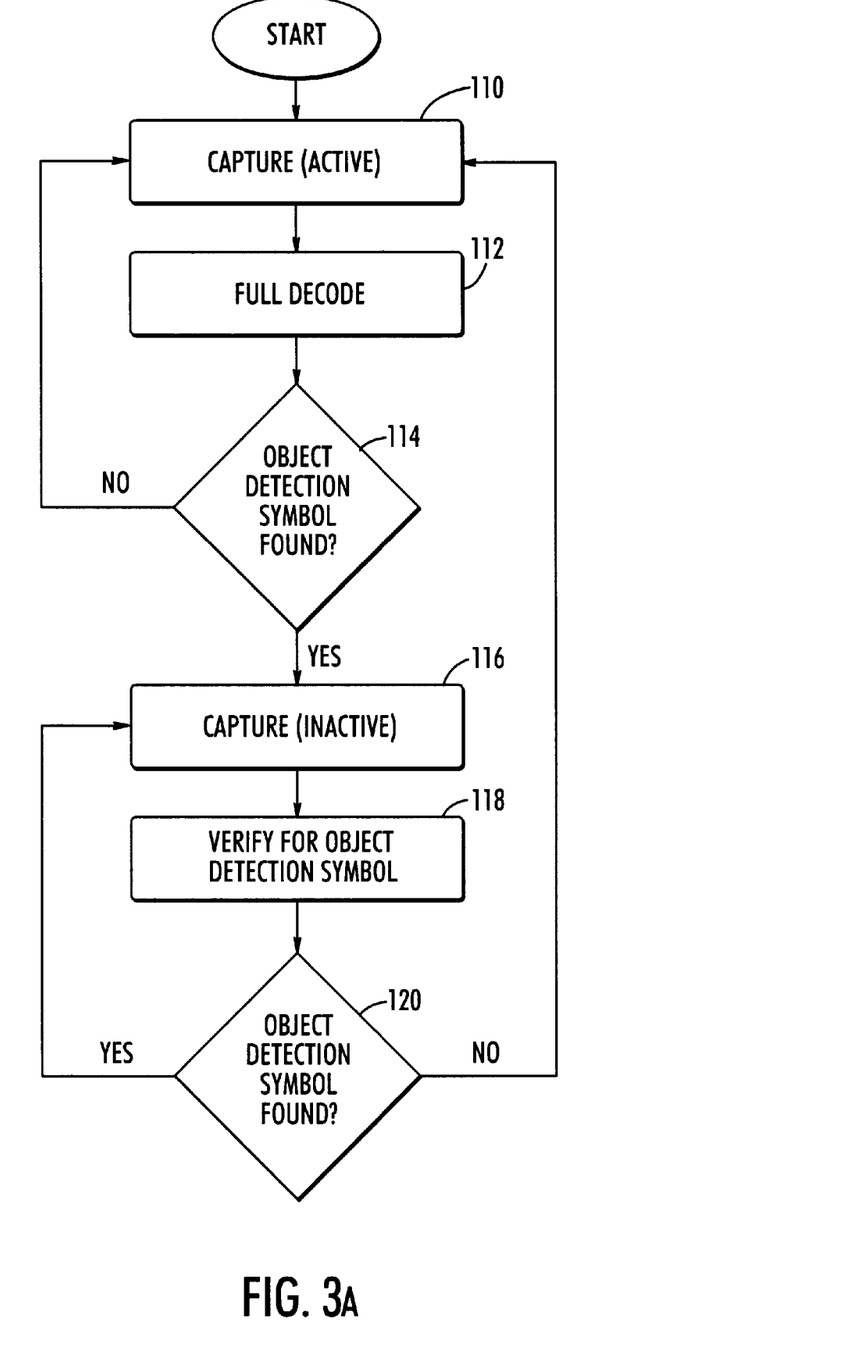
FIG. 3A is a flow diagram illustrating a possible sequence of operations executed by a reader configured according to the invention.

A flow diagram illustrating a sequence of operating states of an optical reader configured in accordance with the invention is shown in FIG. 3. After certain preliminary steps are executed involving initialization of reader hardware and defining memory address locations, controller 40 proceeds to block 110 and commences image capturing in an "active" operating state.

In the active operating state the reader operates in accordance with a conventional scanning operation. Particularly, the reader captures frames of bit map image data (Block 110) representing substantially an entire field of view of an imaging assembly, and from the image data attempts to decode (Block 112) any symbol which may be represented in a field of view. The image capturing is carried out utilizing an illumination source of a standard radiance.

At block 114 reader 10 determines whether object detection symbol 4 has been decoded. If the object detection symbol is decoded, then the condition is indicated that the there is no object in the optical path between imaging assembly 30 and symbol 4. If the object detection symbol is successfully decoded to indicate that there is no object being presented for scanning, then controller 40 is directed to Block 116, and commences operation in an inactive operating state. If a symbol other than object detection symbol 4 is decoded at block 112, the decoded message is normally output at block 112.

In an inactive operating state, then the reader captures and reads image data according to a protocol that is different from the image data capturing and reading protocol of the reader in an active operating state. The characteristic features of an inactive operating state may take on a variety of forms. In general, however, the reader utilizes a relatively lower radiance source of illumination in order to capture image data when operating in an inactive state as compared to that of the illumination source utilized in an active operating state. The fact that the reader can capture image data with a lower radiance source of illumination in an inactive operating state facilitates a reader that is free of the continuous flash distraction problem of prior art presentation scanners configured to operate in a continuous scan mode of operation.

The reader is able to successfully capture and read image data utilizing a relatively lower radiance illumination source in an inactive operating state for a variety of reasons. First, because object detection symbol 4 is a stationary indicia, the exposure time for capturing the symbol can be increased, decreasing the illumination requirements. Second, the object detection symbol can be formed to have high contrast combinations of light and dark spaces which are adapted to provide high quality image data even under lower radiance illumination conditions. The illumination requirements during an inactive operating state of operation can be further reduced by enhancing the optical properties of the object detection symbol.

Figure 1B:
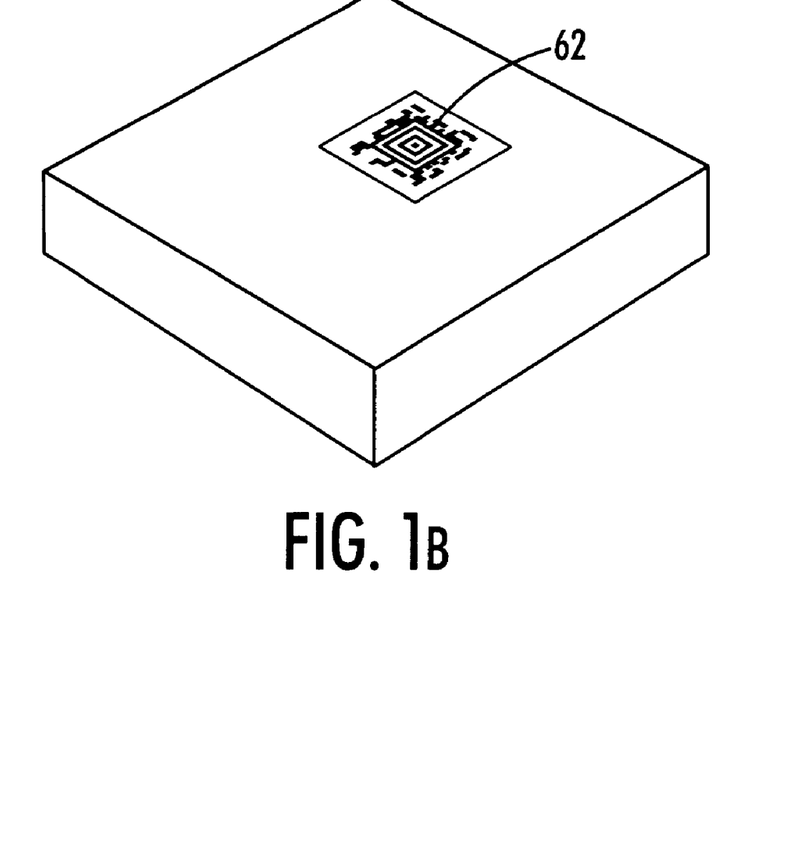
FIG. 1B and 1C show schematic diagrams illustrating alternative configurations for enhancing the optical characteristics of the object detection symbol.
Figure 1C:
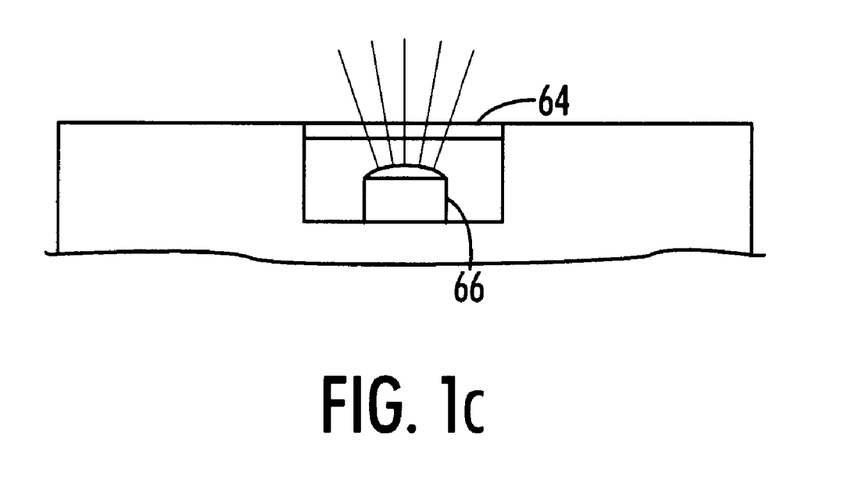

In one embodiment, shown in FIG. 1B the optical characteristics of symbol 4 are enhanced by forming the object detection symbol on a retroflective substrate 62 which reflects light preferentially in the direction of the illumination source. Such a retroflection substrate may be provide for example, by SCOTCH LITE retroflective material of the type manufactured by 3M corporation. In another embodiment, the optical properties of object detection symbol are enhanced by backlighting the symbol by forming the symbol on a translucent or transparent substrate 64 and disposing a light source 66 under the substrate as indicated in FIG. 1C.

The lower radiance illumination source which is actuated in the inactive operating state may be provided by the same light producing element (e.g. LED array 22 as shown in FIG. 2, LED, or lamp) that is actuated in an inactive operating state or else may be provided by a different light producing element specially adapted to generate lower radiance light of a level necessary to carry out the inactive operating state. A lower radiance illumination source corresponding to the inactive state can be supplied using the same light producing element, in general, by supplying reduced electrical power to the light producing element during the inactive operating state. The light producing element providing light during the inactive operating state may generate a different type of light than is produced by the light producing element producing light in the active state of operation. For example, the illumination source in the inactive state may be an infrared light source which produces light that is invisible to the human eye, but which generates light sufficient such that reader captures image data of sufficient quality for the requirements of the inactive operating state.

In addition to requiring lower radiance illumination than the active operating state, the inactive operating state can be carried out without evaluating image data representing an entire field of view of an imaging assembly 30. In the active operating state, it is generally necessary to capture a bit map representation of an entire field of view of imaging assembly 30, and to evaluate image data pertaining to the entire bit map, in order to successfully attempt to decode any symbol which may be in the field of view of the imaging assembly.

However, in the inactive operating state it is unnecessary to attempt to decode any symbol which may be in the field of view of the imaging assembly. Instead, the essential function of the inactive operating state is to determine whether the object detection symbol 4, which is in a stationary position that can be precisely determined, is in the field of view.

Because the location of the object detection symbol in the field of view of an imaging assembly can be precisely determined, a detection symbol verifier algorithm in accordance with the invention can be made which selectively evaluates only so much image data as is necessary to determine whether the object symbol is in the field of view.

In one embodiment of the invention, the position of an object symbol is determined and recorded into a memory space during an active operating state (Block 110) and then and retrieved from the memory space during an inactive state of operation. In an object detection symbol verifier algorithm which makes use of pixel position data pertaining to the position of the symbol, a reader 10 may be made to selectively capture and/or selectively read select image data representing all or a portion of object detection symbol 4 without capturing and reading image data not representing the object detection symbol.

In one embodiment of an object symbol verifier algorithm according to the invention, controller 40 at Block 118 reads position data from memory space 45 or 46 pertaining to the pixel position of symbol 4 and then, in accordance with the position data, reads at least one pixel value from a bit map representation of scene captured by imaging assembly 40 that represents at least a portion of symbol 4. Controller 40 then reads from memory space 45 or 46 a bit or bit pattern representing known features of object detection symbol 4 which have been previously stored in the memory space, and then compares the at least one pixel value read from the bit map to the bit or bit pattern retrieved from memory 45 or 46 in order to determine whether the object detection symbol is in the field of view. The bit or bit pattern representing known characteristics of the detection symbol can be stored in a memory space when the system is manufactured or else may be stored in to a memory space during operation of system 2 subsequent to an image capture being captured by imaging assembly representing symbol 4. Preferably, the determination of whether the object detection symbol is in the field of view is made by evaluating more than one pixel value from the bit map captured at block 116. However, under certain circumstances the determination can made with a high degree of certainty by evaluating only one pixel value, in particular if gray scale or color information is encoded in the pixel value. While the determination of whether object detection symbol 4 is in the field of view is normally made by evaluating image data from a bit map image representation of the symbol, it will be understood that this determination can also be made by evaluating another electrical representation of symbol, for example by evaluating an analog signal waveform output by imaging assembly 30. Furthermore, the determination of whether an object detection symbol is in the field of view, does not necessary involve comparing an electrical representation of the symbol to a stored representation of the symbol. The determination can be made by monitoring for changes in the electrical representation.

In one specific embodiment of the invention, the determination of whether an object detection symbol is in a field of view is carried out by evaluating a predetermined number of pixels known to represent dark indicia and a predetermined number of pixels known to represent light indicia so that the reader readily detects the presence of an object in the path between symbol 4 and imaging assembly 30 whether a light object or a dark object is interposed in the path between symbol 4 and imaging assembly 30.

It will be recognized that controller 40 can evaluate less than all available image data that can be generated by imaging assembly 30 either by selectively "capturing" select image data pertaining to the region of interest, or by selectively "reading" only that image data pertaining to a region of interest. The term "capturing" shall refer to herein the process of receiving by controller 40 a digitized representation of an analog image signal waveform generated by imaging assembly 30, and constructing from the digital representation an initial bit map representation of a scene which is stored in a memory space. The term "reading" shall refer to herein any subsequent data transfers involving image data from the initial bit map. In order to capture less than all available image data which may be output by imaging assembly, then imaging assembly 30 may be programmed to output pixel data for less than all available pixel in the case that imaging assembly is a pixel array based image sensor. In the case that imaging assembly 30 comprises a laser scan engine then the scan engine system may be made to scan to less than the full width of the available scanning range in order to capture less all available image data.

With reference again to the flow diagram of FIG. 3A, it is seen that controller 40 reverts to an active mode of operation (Block 110) when at Block 120 controller 40 determines that objection detection symbol 4 is not in the field of view to indicate than an object (normally, a symbol-bearing substrate) is present in the optical path between imaging assembly 30 and symbol 4.

Figure 3B:
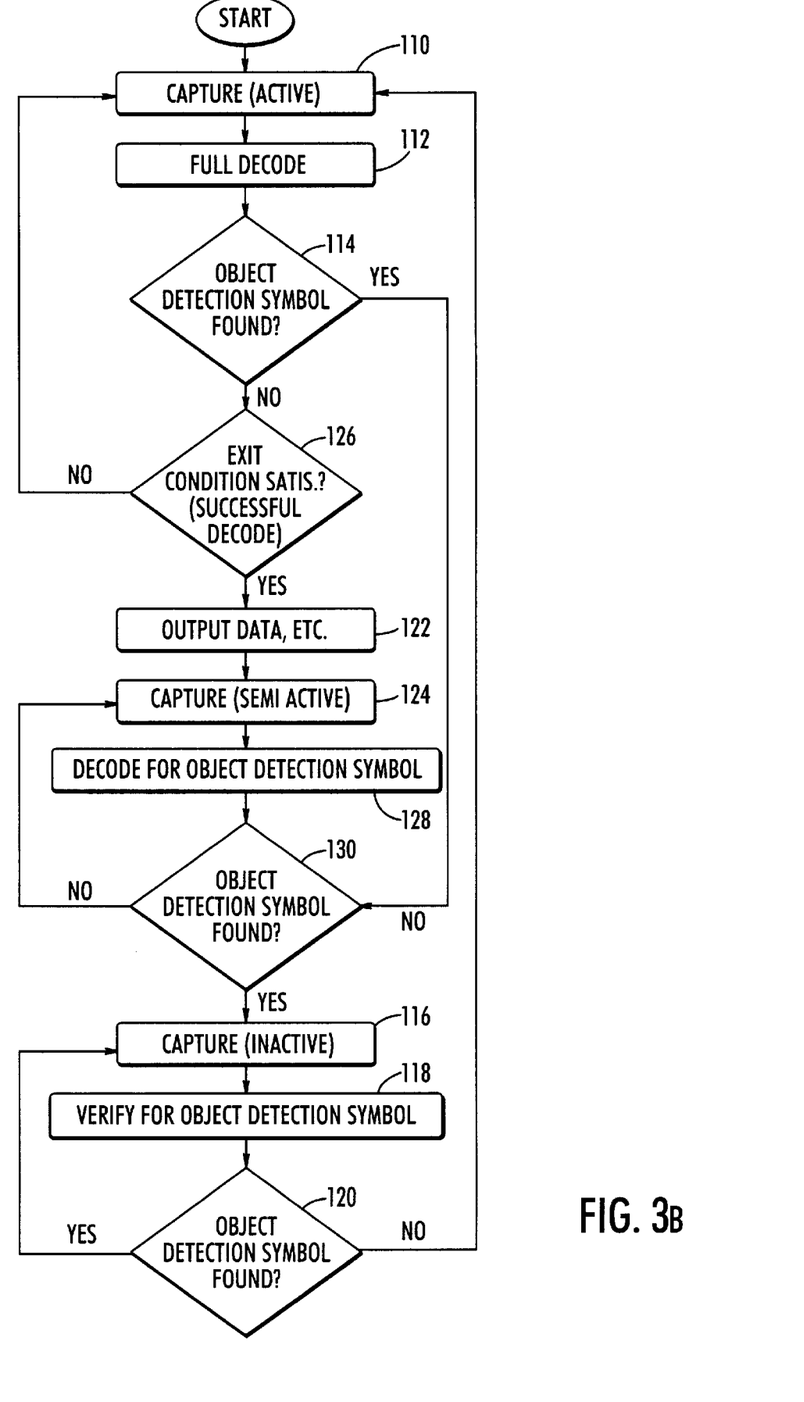
FIG. 3B is a flow diagram illustrating a possible sequence of operations executed by an enhanced reader according to the invention which may operate in a semiactive operating state.

A flow diagram illustrating operation of an enhanced version of the invention is shown in FIG. 3B. In an enhanced version of the invention, then reader 10, in addition to operating in active and inactive operating states, is configured under certain conditions to operate in a "semiactive" operating state. A semiactive operating state (block 124) may be commenced on the condition that it is desired to exit an active, full scanning, full decoding state of operation despite an object being in the optical path between imaging assembly and symbol (as indicated by the object detection symbol not being in the field of view).

It may be desired to exit an active mode of operation despite an object being in the optical path between symbol and imaging assembly, for example, in the case that a symbol presented for scanning is successfully decoded. Exiting of the active state of operation terminates distracting repetitive flashing of a high radiance illumination source, which is not necessary if a symbol is successfully decoded. Another exit condition (block 126) causing exiting of the active operating state may be that a captured representation of a scene is successfully output to an output destination such as a memory space or display device. This exit condition is highly useful, for example, in the case that system of the invention is employed for general image capture and processing application and not specifically for bar code decoding applications.

A semiactive operating state is similar to an inactive operating state. The essential function of the semiactive operating state, as is the case with the inactive operating state, is to determine if object detection symbol 4 is in the field of view. A difference is that while the inactive state is exited (Block 120) on the condition that the detection symbol is not in the field of view (indicating that an object has been presented for scanning) the semiactive operating state is exited on the condition that controller 40 determines at block 130 that detection symbol 4 is in the field of view (indicating that an object has been removed from the optical path between the imaging assembly and symbol). When the semiactive operating state is exited on the condition that an object has been removed from the imaging assembly-to-symbol optical path, the state of operation of the reader switches to an inactive operating state (block 116).

The operating characteristics of the inactive and semiactive operating states are similar and in some instances may be substantially the same. A semiactive operating state can be carried out using a lower radiance source illumination than is used during an active operating state. However, unlike the inactive operating state, the semiactive operating state normally requires capturing image data representing substantially an entire field of view of an imaging assembly unless the position of object detection symbol 4 is previously known. As frames of image data are captured during the semiactive operating state, a decoding algorithm operates on the image data (Block 128) which attempts to decode for the object detection symbol. The decoding algorithm executed during the semiactive operating state, which decodes for the object detection symbol, whose symbology type and features are known, can in general be less powerful than the decoding algorithm of the active operating state, which is adapted to decode (Block 112) for an unknown symbol of an unknown symbology. If the position of the object detection symbol is known (such as in the case of a reader being manufactured to be permanently in a stationary position in relation to a detection symbol) then the decoding algorithm of the semiactive state can be provided by an algorithm having substantially the same features as the symbol verifier algorithm of the inactive operating state (block 118).

While this invention has been described in detail with reference to a preferred embodiment, it should be appreciated that the present invention is not limited to that precise embodiment. Rather, in view of the present disclosure which describes the best mode for practicing the invention, many modifications and variations would present themselves to those skilled in the art without departing from the scope and spirit of this invention, as defined in the following claims.

What is claimed is:

1. A system for sensing the presence of an object, said system comprising:
   an optical reader including an imaging assembly for outputting image information and a controller in communication with a memory space;
   an object detection symbol disposed a field of view of said imaging assembly;
   determining means responsive to said image information for analyzing said image information and determining therefrom whether said image information represents features of said object detection symbol.

2. The system of claim 1, wherein said determining means includes capture means for capturing at least a partial bit map representation of a scene defined by said field of view.

3. The system of claim 1, wherein said memory space has stored thereon at least a partial representation of said object detection symbol and wherein said determining means captures at least a partial bit map representation of a scene defined by said field of view in an area of said scene including said object detection symbol, and wherein said determining means includes means for comparing said bit map representation of said scene to said at least partial representation of said object detection symbol stored in said memory space.

4. The system of claim 1, wherein said determining means is adapted to monitor for changes in said image information.

5. The system of claim 1, wherein said object detection symbol includes means for enhancing optical properties of said object detection symbol.

6. The system of claim 1, wherein said object detection symbol is formed on a retroflective material, whereby optical properties of said symbol are enhanced.

7. The system of claim 1, further comprising:
   a translucent substrate containing said object detection symbol;
   a light source disposed behind said translucent substrate relative to said imaging assembly for enhancing optical properties of said object detection symbol.

8. A method for operating a stationary position type optical reader having an imaging assembly and a controller in communication with a memory space, said method comprising the steps of:
   providing an object detection symbol in a field of view of said imaging assembly in an active operating state, capturing image data representing a scene defined by said field of view;
   assessing said captured image data;
   switching operation of said reader to an inactive operating state when said image data indicates that said object detection symbol is in said field of view.

9. The method of claim 8, wherein said inactive operating state is characterized by a radiance of illumination that is lower than a radiance of illumination of said reader in an active operating state.

10. The method of claim 8, wherein in said inactive state said controller evaluates less than all image data available from said imaging assembly.

11. The method of claim 8, wherein in said inactive state said controller evaluates at least one pixel value known to represent a dark indicia and at least one pixel value known to represent a light indicia so that the presence of an object in a path between said imaging assembly and said symbol is readily detected whether a light object or a dark object is interposed in said path.

12. The method of claim 8, wherein said imaging assembly is a laser scan engine based imaging assembly and wherein said scan engine system is adapted to scan at less than a full scanning range when said reader is in said inactive state of operation.

13. The method of claim 8, further including the steps of:
   in said inactive operating state, developing an electrical representation of at least a portion of a scene defined by said field of view;
   evaluating said electrical representation;
   changing operation of said reader to said active operating state when said electrical representation indicates that at least a portion of said object detection symbol is not in a field of view of said imaging assembly.

14. The method of claim 8, further including the steps of:
   in said active operating state, deciding whether an active state exit condition has been satisfied;
   altering operation of said reader to a semiactive operating state when an active state exit condition is satisfied, said reader in said semiactive operating state constructing image information representing a scene defined by said field of view;
   switching operation of said reader to said inactive operating state when said image information indicates that said object detection symbol is in said field of view.

15. The method of claim 14, wherein said exit condition is satisfied when a bar code symbol is successfully decoded.

16. A method for operating a stationary position type optical reader having an imaging assembly and a controller in communication with a memory space, said method comprising the steps of:

provsiding an object detection symbol in a field of view of said imaging assembly;

in an inactive state, developing an electrical representation of a scene defined by said field of view;

evaluating said electrical representation;

changing operation of said reader to an active operating state when said electrical representation indicates that at least a portion of said object detection symbol is not in said field of view.

17. The method of claim 16, wherein said inactive operating state is characterized by a radiance of illumination that is lower than a radiance of illumination of said reader in an active operating state.

18. The method of claim 16, wherein in said inactive state said controller evaluates less than all image data available from said imaging assembly.

19. The method of claim 16, wherein in said inactive state said controller evaluates at least one pixel value known to represent a dark indicia and at least one pixel value known to represent a light indicia so that the presence of an object in a path between said imaging assembly and said symbol is readily detected whether a light object or a dark object is interposed in said path.

20. The method of claim 16, wherein said imaging assembly is a laser scan engine based imaging assembly and wherein said scan engine system is adapted to scan at less than a full scanning range when said reader is in said inactive state of operation.

* * * * *